United States Patent [19]

Garnier

[11] Patent Number: 4,611,275
[45] Date of Patent: Sep. 9, 1986

[54] TIME SHARING DEVICE FOR ACCESS TO A MAIN MEMORY THROUGH TO A SINGLE BUS CONNECTED BETWEEN A CENTRAL COMPUTER AND A PLURALITY OF PERIPHERAL COMPUTERS

[75] Inventor: Jean-François Garnier, Rueil-Malmaison, France

[73] Assignee: Jeumont-Schneider, France

[21] Appl. No.: 581,813

[22] Filed: Feb. 21, 1984

Related U.S. Application Data

[63] Continuation-in-part of Ser. No. 247,293, Mar. 26, 1981, abandoned.

[30] Foreign Application Priority Data

Jul. 30, 1979 [FR] France ................. 79 19505

[51] Int. Cl.[4] .............. G06F 13/14; G06F 13/36
[52] U.S. Cl. .................................. 364/200
[58] Field of Search ... 364/200 MS File, 900 MS File

[56] References Cited

U.S. PATENT DOCUMENTS

| | | | |
|---|---|---|---|
| 3,289,168 | 11/1966 | Walton et al. | 364/200 |
| 3,629,854 | 12/1971 | Hauck | 364/200 |
| 3,959,775 | 5/1976 | Valassis et al. | 364/200 |
| 4,034,347 | 7/1977 | Robert, Jr. | 364/200 |
| 4,040,028 | 8/1977 | Pauker et al. | 364/200 |
| 4,096,572 | 6/1978 | Namimoto | 364/200 |
| 4,104,720 | 8/1978 | Gruner | 364/200 |
| 4,128,876 | 12/1978 | Ames et al. | 364/200 |
| 4,151,592 | 4/1979 | Suzuki et al. | 364/200 |
| 4,153,934 | 5/1979 | Sato | 364/200 |
| 4,219,873 | 8/1980 | Kober et al. | 364/200 |

OTHER PUBLICATIONS

"An Asynchronous Arbiter Resolves Resource Allocation Conflicts on a Random Priority Basis", by K. Soe Hojberg, Computer Design, vol. 16, No. 8, Aug. 1977.

Primary Examiner—Eddie P. Chan
Attorney, Agent, or Firm—Schwartz, Jeffery, Schwaab, Mack, Blumenthal & Evans

[57] ABSTRACT

The present invention incudes a searching circuit which sequentially accesses a plurality of peripheral computers to receive requests for access by these computers to a principal memory normally occupied by a principal computer. The searching circuit determines the identity of the requesting computer and passes the request on to a decision circuit which receives information from the principal computer and the peripheral computers as to the state of occupancy of the access bus to the principal memory. If the bus is not occupied and the principal computer does not require use of the principal memory, the request is granted by the decision circuit.

2 Claims, 2 Drawing Figures

TIME SHARING DEVICE FOR ACCESS TO A MAIN MEMORY THROUGH TO A SINGLE BUS CONNECTED BETWEEN A CENTRAL COMPUTER AND A PLURALITY OF PERIPHERAL COMPUTERS

This application is a continuation-in-part application of Ser. No. 247,293, filed Mar. 26, 1981, now abandoned.

BACKGROUND OF THE INVENTION

The present invention concerns a time sharing device for access to a principal memory connected to a single bus between a central computer and a plurality of peripheral computers.

Such a device is particularly useful in installations including several rapid peripheral computers, particularly for the transmission of data. In such installations, in order to permit a central control computer to be free to execute a recorded control program, a plurality of peripheral exchange units are used. Each peripheral unit contains a low capacity, programmed peripheral computer which performs elementary functions at a local level.

These peripheral computers must, from time to time, have access to a principal memory, for example for the exchange of information with the central computer or other peripheral computers.

The principal memory is then connected to a single bus and a time sharing device is used to control access to the main memory.

Such devices are generally complex, expensive and slow. It is the object of the present invention to eliminate these disadvantages.

The device according to the present invention comprises a searching circuit to detect a peripheral computer that has requested to be connected with the single bus for access to the principal memory, and a decision circuit for authorizing the peripheral computer requesting access to the principal memory to connect to the single bus when access to the bus is possible.

The searching circuit is connected bidirectionally to the different peripheral computers and to the decision circuit. The decision circuit is also connected bidirectionally with the different peripheral computers and the central computer.

BRIEF DESCRIPTION OF THE DRAWINGS

The present invention will be understood better and further objects, characteristics and advantages will become more clearly apparent from the description hereinbelow of a preferred embodiment of the invention, reference being made to the accompanying drawings in which like reference numerals represent like parts throughout and in which.

DETAILED DESCRIPTION OF THE PREFERRED EMBODIMENT

Figure 1:
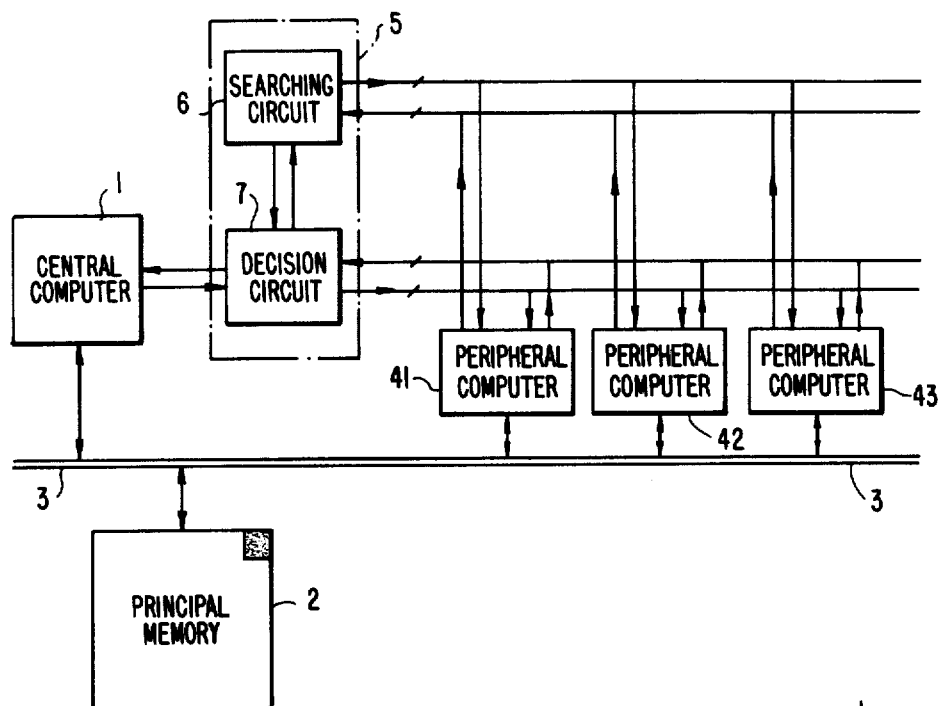
FIG. 1 schematically shows the device according to the invention and its connections with the different computers of the installation, and FIG. 2 schematically shows the preferred embodiment of the searching circuit and decision circuit of the present invention.

Referring now to FIG. 1, a central computer 1 is connected to a principal memory 2 by means of a transmission bus 3. The peripheral computers 41, 42, 43 . . . may also be connected with the bus 3.

In the figure, only three peripheral computers are represented, but it should be understood that the number of peripheral computers may differ from three. In telephone systems, for example, because of accepted standards, the number of the peripheral computers is less than or equal to 16.

The different computers operate in an asynchronous manner, but it is possible to synchronize them by means of the addition of a common clock.

Normally, only the central computer 1 has access permanently to the memory 2 by means of the transmission bus 3, the peripheral computers 41, 42, 43 . . . being disconnected from the bus 3.

However, when one of the latter has need for access to a large memory, for example for the exchange of information with another computer, authorization must be requested from the time sharing device 5. Device 5 determines when the peripheral computer may connect with the bus, and ensures that no confusion will result with respect to the information circulating in the bus.

For this purpose, the device 5 comprises a searching circuit 6 connected in a bidirectional manner with the different peripheral computers 41, 42, 43 . . . Searching circuit 6 functions, on the one hand, to detect access requests emitted by one of the peripheral computers, and on the other hand, to determine the address of the peripheral computer emitting the request.

The address is then transmitted to the different peripheral computers 41, 42, 43 . . . and the existence of a request for access to the bus 3 is communicated to the decision circuit 7. Decision circuit 7 also receives information concerning the state of occupancy or lack of occupancy of the bus 3 by means of its bidirectional connection with the peripheral computers, and receives information concerning authorization to award the bus 3 to a peripheral computer from the central computer 1. If the central computer 1 may be disconnected from the bus 3 without interrupting a sequence of transmission then under way with the memory 2, authorization is awarded.

When the searching circuit 6 has detected a request to be connected to bus 3 emitted, for example, by the computer 42, the decision circuit 7 verifies with the different peripheral computers that the bus is free and, if the central computer does not require use of the memory 2, grants authorization to the computer 42 to connect with the bus 3.

The searching circuit 6 then continues its operation and, when the termination of the occupation of the bus 3 by the peripheral computer 42 is detected, the central computer 1 will again have access to the memory 2 by means of the bus 3.

As is evident from the foregoing, the access cycle to the memory 2 is asynchronous and only certain service signals must be synchronized for reasons of compatibility between the different computers.

The transmission of a message from one computer to another is effected by means of a entry cycle in the memory 2, actuated by the emitting computer, and followed by a reading cycle of the memory 2, performed by the receiving computer; the connections required to inform the receiving computer that it must effect a reading cycle of the memory 2 are not shown in the figure, because they are not part of the invention.

Figure 2:
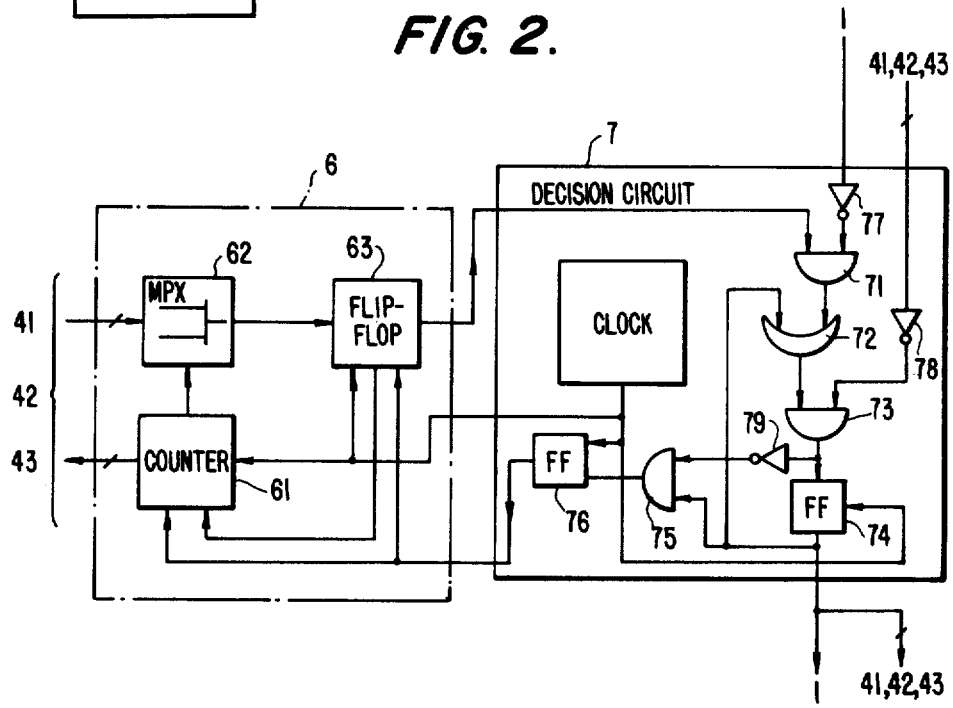

A preferred embodiment of the device 5 is shown in FIG. 2, wherein elements in common with the diagram of FIG. 1 are designated by the same reference numerals. The searching circuit 6 includes essentially a cyclic counter 61, a multiplexer 62 and a clocked D flip-flop 63. The inputs to the multiplexer 62 are connected with the different peripheral computers 41, 42, 43 . . . and multiplexer 62 is controlled by means of the cyclic counter 61. The cycle time of counter 61 depends on the number of peripheral computers that may be connected to the bus 3. For example, the connection time of the multiplexer to each input line may be equal to 200 nanoseconds.

The clock inputs of counter 61 and flip-flop 63 are connected to the output of a clock circuit 80. When the request emitted by one of the peripheral computers 41, 42, 43 . . . to be connected with the bus is detected, the flip-flop 63 changes its state and blocks the cyclic counter 61 on the address of the peripheral computer having emitted the request. Counter 61 is connected to each of the peripheral computers so that each computer is notified when its input line to searching circuit 6 is being accessed by multiplexer 62. When counter 61 is blocked on the address of the peripheral computer making a request, the address indicates that it will be the next peripheral computer to be granted access to the bus.

The decision circuit 7 includes essentially three AND gates 71, 73, 75, an OR gate 72, two D-flip-flops 74, 76 and three inverters 77, 78, 79. Flip-flops 74 and 76 are clocked by the signal from clock circuit 80.

The inputs of AND gate 71 are connected with the output of flip-flop 63 and with the central computer 1 through the inverter 77. By means of these connections, the decision circuit 7 receives a request for use of the bus by one of the peripheral computers through flip-flop 63 and also receives a signal through inverter 77 indicating whether the central computer requires or is currently occupying the bus, or alternately, whether use of the bus is not required by the central computer.

When a request signal from one of the peripheral computers is generated, AND gate 71 inhibits the request signal when either the central computer 1 requires the bus or is using it. When the bus is not in use or required by the central computer, the signal is passed to OR gate 72 and then to the first input of AND gate 73. The second input of AND gate 73 is connected to the peripheral computers 41, 42, 43 through inverter 78. This connection provides a signal indicating whether or not the bus is presently being occupied by one of the peripheral computers. AND gate 73 inhibits the output signal of OR gate 72 if one of peripheral computers is using the bus. When no peripheral computer is using the bus, the signal is passed by AND gate 73 to the data input of flip-flop 74 and sets flip-flop 74.

The output of flip-flop 74 is passed to all of the peripheral computers and to the main computer. Receipt of this signal by the peripheral computer receiving an address from counter 61 indicates to that computer that it is free to use the bus. The output of flip-flop 74 is also connected to the second input of OR gate 72 to maintain the value of the output signal of flip-flop 74 until the peripheral computer, addressed by counter 61, begins to use the bus. The signal from flip-flop 74 indicates to the other computers that the bus is busy and to refrain from use of the bus.

The output of AND gate 73 is also connected through inverter 79, to the first input of AND gate 75, the second input of which is connected to the output of flip-flop 74.

The output of AND gate 75 is connected to the data input of flip-flop 76. AND gate 75 inhibits the output signal of flip-flop 74 until the peripheral computer begins to use the bus. When the peripheral computer begins to use the bus, the second input signal and AND gate 73 changes causing a change in the output of AND gate 73. Before the output signal of flip-flop 74 also changes, the signal from AND gate 73 passes through AND gate 75. The output signal of AND gate 75 sets flip-flop 76 at the nxt clock pulse from clock circuit 80. At this same time, the same clock pulse resets flip-flop 74. At the next clock pulse, flip-flop 76 is also reset. At this same next clock pulse, the output signal of flip-flop 76 resets flip-flop 63 and unblocks counter 61 and the searching circuit is returned to service.

Even though only one embodiment has been described, it is evident that any modification applied by those skilled in the art in the spirit of the invention would not exceed the scope of the invention.

For example, priority of access to the bus 3 may be assigned to certain computers by means of a simple modification applied to the searching circuit 6. Similarly, a surveillance circuit may be added to limit the time of access to the principal memory allocated to each peripheral computer.

What is claimed is:

1. A time sharing device in a system having a principal memory connected to a single bus, said single bus also being connected to a central computer and a plurality of peripheral computers and in which the central computer is normally occupying said bus to communicate through said bus to said memory, said time sharing device comprising:

searching circuit means connected to said peripheral computers in a bidirectional manner for cyclically accessing said peripheral computers in a predetermined order and receiving requests to use said single bus from an accessed computer, and for identifying the peripheral computer making a request;

decision circuit means connected to said searching circuit means and connected in a bidirectional manner to said central computer and said peripheral computers for receiving information from said central computer and said peripheral computers concerning the state of occupancy of said single bus and granting authorization to the peripheral computer making a request only when said single bus is free and use of the single bus is not required by the central computer; and wherein said searching circuit includes a cyclic counter, a multiplexer and a flip-flop, said multiplexer being controlled by said cyclic counter the cycle whereof depends on the number of the said peripheral computers being connected to said bus, said cyclic counter having an address output connected to said peripheral computers, said multiplexer having inputs connected, respectively, to said peripheral computers, an output connected to a set input of said flip-flop, said flip-flop being connected to said cyclic counter so that said cyclic counter is inhibited on the output connected to the peripheral computer having requested to use said bus, said flip-flop also being connected to an input of said decision circuit for transmitting a signal to said decision circuit indicating that a request is being received, an output of said decision circuit being connected with a reset input of said flip-flop so as to return the said flip-flop to its initial state, and to a control input of said cyclic counter in order to return said cyclic counter to service when authorization to use said bus has been granted by said decision circuit.

2. A device according to claim 1 wherein said decision circuit includes input lines from said central computer and said peripheral computers, output lines to said central computer and said peripheral computers, circuit means responsive to receipt of a request signal for passing the same signal along all of said decision circuit output lines, and gate means for inhibiting the passing of a request signal when a predetermined signal is received on any of said decision circuit input lines and passing the request signal to said circuit means in the absence of said predetermined signal, said predetermined signal being indicative of the state of occupancy of said bus.

* * * * *